US012052159B2

(12) United States Patent
Klemetti et al.

(10) Patent No.: US 12,052,159 B2
(45) Date of Patent: Jul. 30, 2024

(54) NETWORK COMMUNICATIONS WITH OPTIMIZED QUALITY

(71) Applicant: LiveQoS Inc., Ottawa (CA)

(72) Inventors: Miika Anttoni Klemetti, Kanata (CA); Benjamin Skinner, Kanata (CA)

(73) Assignee: Adaptiv Networks Inc.

( * ) Notice: Subject to any disclaimer, the term of this patent is extended or adjusted under 35 U.S.C. 154(b) by 54 days.

(21) Appl. No.: 16/021,807

(22) Filed: Jun. 28, 2018

(65) Prior Publication Data

US 2020/0007430 A1    Jan. 2, 2020

(51) Int. Cl.
| | |
|---|---|
| *H04L 45/02* | (2022.01) |
| *G06N 20/00* | (2019.01) |
| *H04L 41/0813* | (2022.01) |
| *H04L 41/0823* | (2022.01) |
| *H04L 41/5019* | (2022.01) |
| *H04L 65/102* | (2022.01) |
| *H04L 65/80* | (2022.01) |

(52) U.S. Cl.
CPC ............. *H04L 45/08* (2013.01); *G06N 20/00* (2019.01); *H04L 41/0813* (2013.01); *H04L 41/0823* (2013.01); *H04L 41/5019* (2013.01); *H04L 65/102* (2013.01); *H04L 65/80* (2013.01)

(58) Field of Classification Search
CPC . H04L 45/08; H04L 41/0813; H04L 41/0823; H04L 41/5019; H04L 65/102; H04L 65/80; G06N 20/00
USPC ............................................................. 709/223
See application file for complete search history.

(56) References Cited

U.S. PATENT DOCUMENTS

| | | | | |
|---|---|---|---|---|
| 6,198,920 | B1* | 3/2001 | Doviak | H04W 28/06 455/560 |
| 2014/0105216 | A1* | 4/2014 | McDysan | H04L 67/1095 370/400 |
| 2016/0308734 | A1* | 10/2016 | Feller | H04L 41/5009 |
| 2017/0374318 | A1* | 12/2017 | Yang | H04L 65/80 |

OTHER PUBLICATIONS

Gaixas, et al; "Assuring QoS Guarantees for Heterogeneous Services in RINA Networks with deltaQ", Dec. 2016.

* cited by examiner

*Primary Examiner* — Suraj M Joshi
(74) *Attorney, Agent, or Firm* — Stratford Group Ltd.

(57) ABSTRACT

A method for configuring a data path comprising receiving, by a gateway server, a network request from a source to a destination. The network request is associated with a path quality level. A plurality of possible links between the gateway server and a destination server is determined. Each of the plurality of possible links is associated with one of a plurality of predictive models. Each of the plurality of predictive models produces an estimate of a link quality level. Utilizing the plurality of predictive models, a plurality of links between the gateway server and the destination server utilizing the plurality of possible links is selected. The plurality of selected links forms a selected path that satisfies the path quality level. A plurality of routers at both ends of the plurality of selected links are configured to fulfill the network request.

14 Claims, 5 Drawing Sheets

NETWORK COMMUNICATIONS WITH OPTIMIZED QUALITY

BACKGROUND OF THE INVENTION

Field of the Invention

The present invention relates to data transmissions in a communications network and more particularly to optimizing quality parameters of the transmission.

Description of Related Art

Computer networks such as the Internet, allow for the exchange of data between connected users and access to remote computing and data resources. The level of service that a user is likely to experience is highly variable as the Internet is based on "best effort" service. This means that the network will attempt to deliver data packets to the destination as fast as it can and with little loss as possible.

Resource sharing on this "best effort" basis provides no guarantees regarding the delivery of those data packets. This means that the user has no way of knowing how long a data packet will take to arrive at its destination nor even if there is a likelihood of its eventual arrival. The level of service is highly dependent upon a number of factors including least cost routing algorithms, equipment problems, traffic congestion, and others. As such the quality of experience and quality of service is unpredictable and may not meet the needs of the user.

Research has been done to define a quality of experience (QoE) for connections based on end to end delay. Deviation from the ideal QoE is degraded by queueing delays and packet loss until it becomes unacceptable. This is measured over each hop in the transmission path and then combined to give an overall QoE value. Each network SaaS (software as a service) service has an associated QoE delay defines, typically in ms, and the network is managed in order to keep QoE deviation within acceptable limits.

This system is limited in that it defines QoE based on latency which is a key measurement for some services but is not of primary importance for others. Present methods to obtain QoE lack flexibility for a wide range of network services and lack a reliable means of obtaining the required QoE.

There is a need for a system and method for improved QoE or quality of service (QoS) by providing a predictable delivery of data packets based on the relevant quality parameters of the transmission.

Other aspects and features of the present invention will become apparent to those ordinarily skilled in the art upon review of the following description of specific embodiments of the invention in conjunction with the accompanying figures.

BRIEF SUMMARY OF THE INVENTION

Embodiments of the invention include a system and method for configuring a data path in a communications network comprising receiving, by a gateway server, a network request from a source to a destination. The network request is associated with a path quality level. The gateway server and the source communicate using a first communications protocol. A plurality of possible links between the gateway server and a destination server are determined. The destination server and the destination communicate using the first communications protocol. Each of the plurality of possible links is associated with one of a plurality of predictive models. Each of the plurality of predictive models produces an estimate of a link quality level. The plurality of predictive models is utilized to select a plurality of selected links between the gateway server and the destination server utilizing the plurality of possible links. The plurality of selected links forms a selected path that satisfies the path quality level. A plurality of routers at both ends of the plurality of selected links is configured. A permission to fulfill the network request is transmitted by the gateway server to the source.

In some embodiments, the plurality of predictive models are determined using a machine learning algorithm based on a plurality of measured network parameter data for each of the plurality of possible links.

In other embodiments, the machine learning algorithm is based on a weighted combination of the plurality of measured network parameter data. In further embodiments, a higher weighting is given to a more predictive parameter of the plurality of measured network parameters.

In other embodiments, the gateway server responds to the network request with an HTTP redirect response.

In other embodiments, the path quality level is defined through an API accessed by a computer program executed on the source.

Further embodiments comprise monitoring the link quality levels of the plurality of selected links and the path quality level during data transmissions between the source and the destination.

In some embodiments, the data received from the source is segmented by the gateway server and reassembled by the destination server. In other embodiments, the data received from the source is encapsulated by the gateway server and de-encapsulated by the destination server.

Other aspects and features of the present invention will become apparent to those ordinarily skilled in the art upon review of the following description of specific embodiments of the invention in conjunction with the accompanying figures.

BRIEF DESCRIPTION OF THE SEVERAL VIEWS OF THE DRAWING(S)

Embodiments of the present invention will now be described, by way of example only, with reference to the attached Figures, wherein.

DETAILED DESCRIPTION OF THE INVENTION

The present invention relates to data transmissions in a communications network and more particularly to optimizing quality parameters of the transmission.

Figure 1:
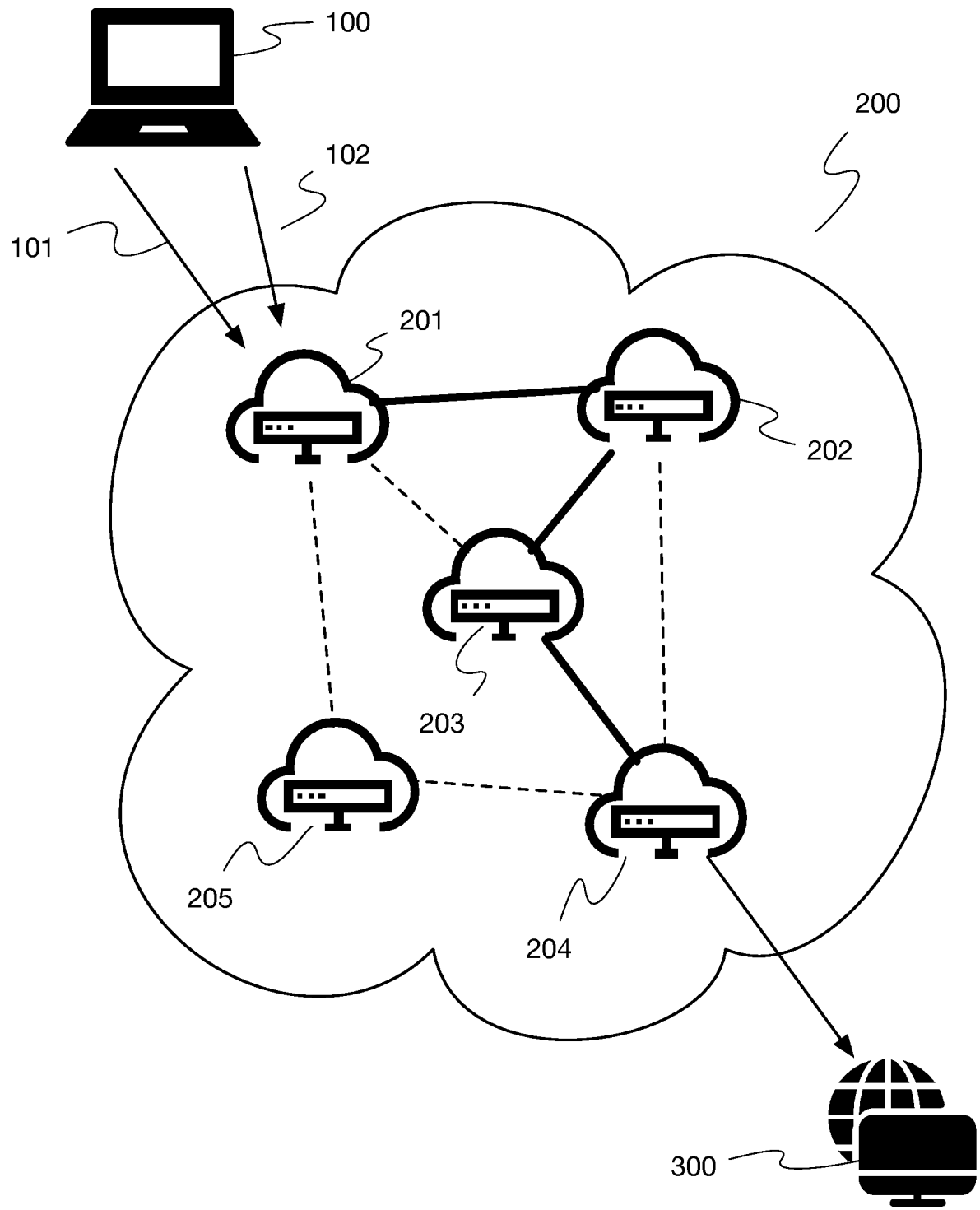
FIG. 1 depicts a network environment supporting embodiments of the invention.

An overall view of an embodiment of the invention is shown in FIG. 1. A computing device 100 is connected to the Internet. The computing device 100 may be any one of a number of devices such as a PC, server, cellular phone, IoT (Internet of Things) device, or any networked device that accesses a network 200 through a wired or wireless connection. The computing device 100 may be under control of an operator, such as a PC user, or may be automated, such as a networked camera. The computing device 100 may have a number of network connections, shown here as 101 and 102, which may be different types of connections such as TCP and UDP, access to different SaaS applications, or any plurality of network connections that require different QoS or QoE.

The network 200 in most cases can be referred to as the Internet but may include any number of public and private network and is not limited to any one technology, topology, or protocol. In some embodiments, the network includes cloud computing servers, and supports a number of cloud-based SaaS services. Network links between nodes may be connected by public, private, and leased networks. Cloud computing servers operate virtual machines (VMs) which may be set up, torn down, and migrated between the physical server hardware. VMs may reside in and operate on single servers or be distributed over a number of servers.

Within the network, cloud servers 201 through 205 are connected by links. The cloud servers can be shared VMs, dedicated VMs, or bare-metal servers, leased from cloud computing vendors such as Azure, DigitalOcean, and AWS. Each cloud server is located in a chosen region or data-center and can easily be provisioned in other regions as required. Each cloud server includes a network router which typically runs as a light-weight container. These containers can be deployed to run on clusters of cloud servers. The containers are not confined to a fixed cloud server and may be moved within the cloud or between cloud computing vendors. Server 201 is in communication with computing device 100. Server 204 is in communication with application server 300. The communication to be optimized is between computing device 100 and application server 300. Embodiments select a path between the computing device 100 and the application server 300 in order to optimize a set of predefined network parameters. FIG. 1 illustrates a path from computing device 100 to gateway server 201, to server 202, to server 203, to server 204, and on to application server 300.

Figure 2:
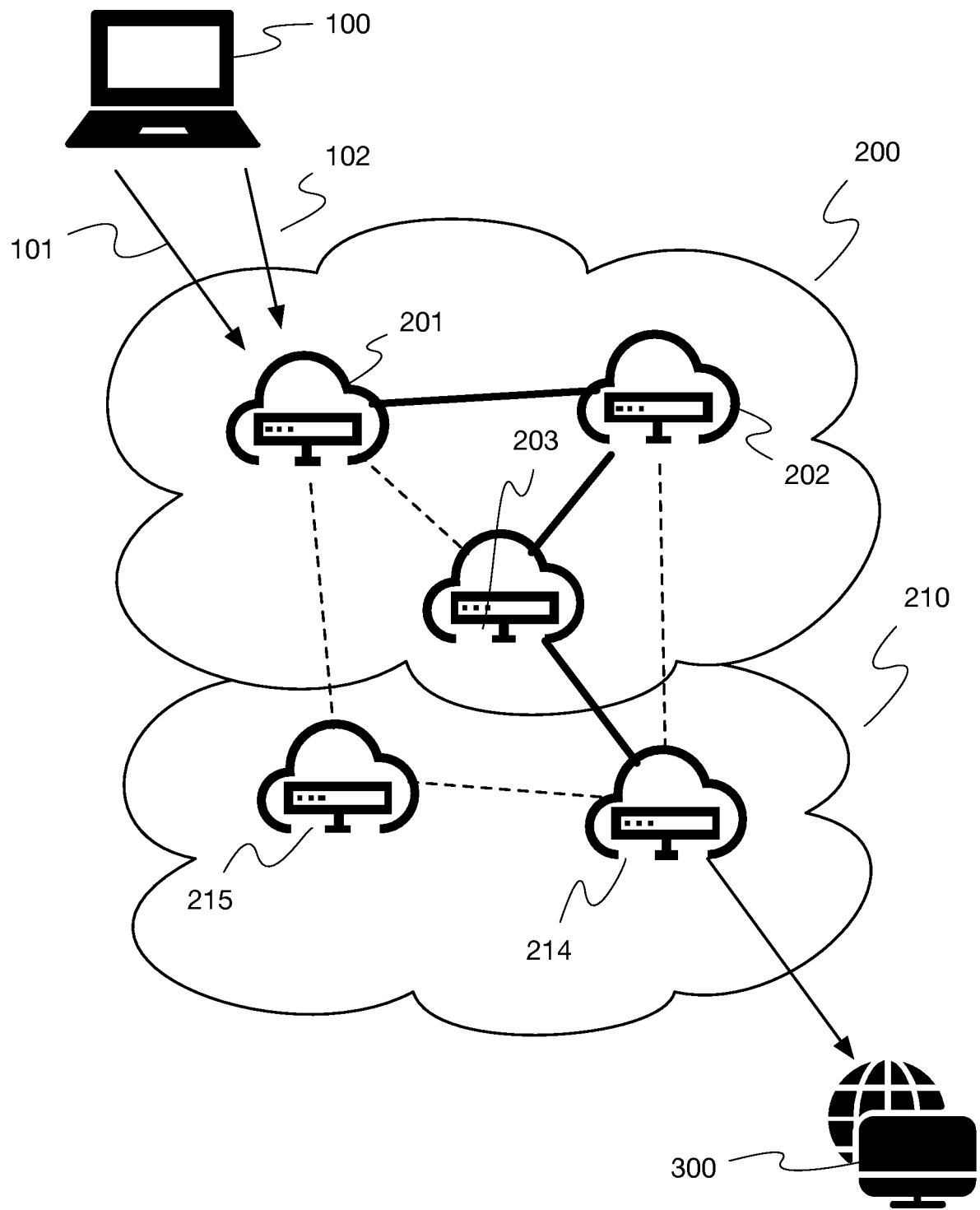
FIG. 2 depicts a complex network environment supporting embodiments of the invention.

FIG. 1 illustrates an embodiment where the network 200 comprises a single cloud network. FIG. 2 illustrates an embodiment where the network comprises multiple cloud networks 200 and 210.

Embodiments perform measurements on each network link between cloud servers to measure the quality of each link and to predict the quality of the link in the future.

Figure 3:
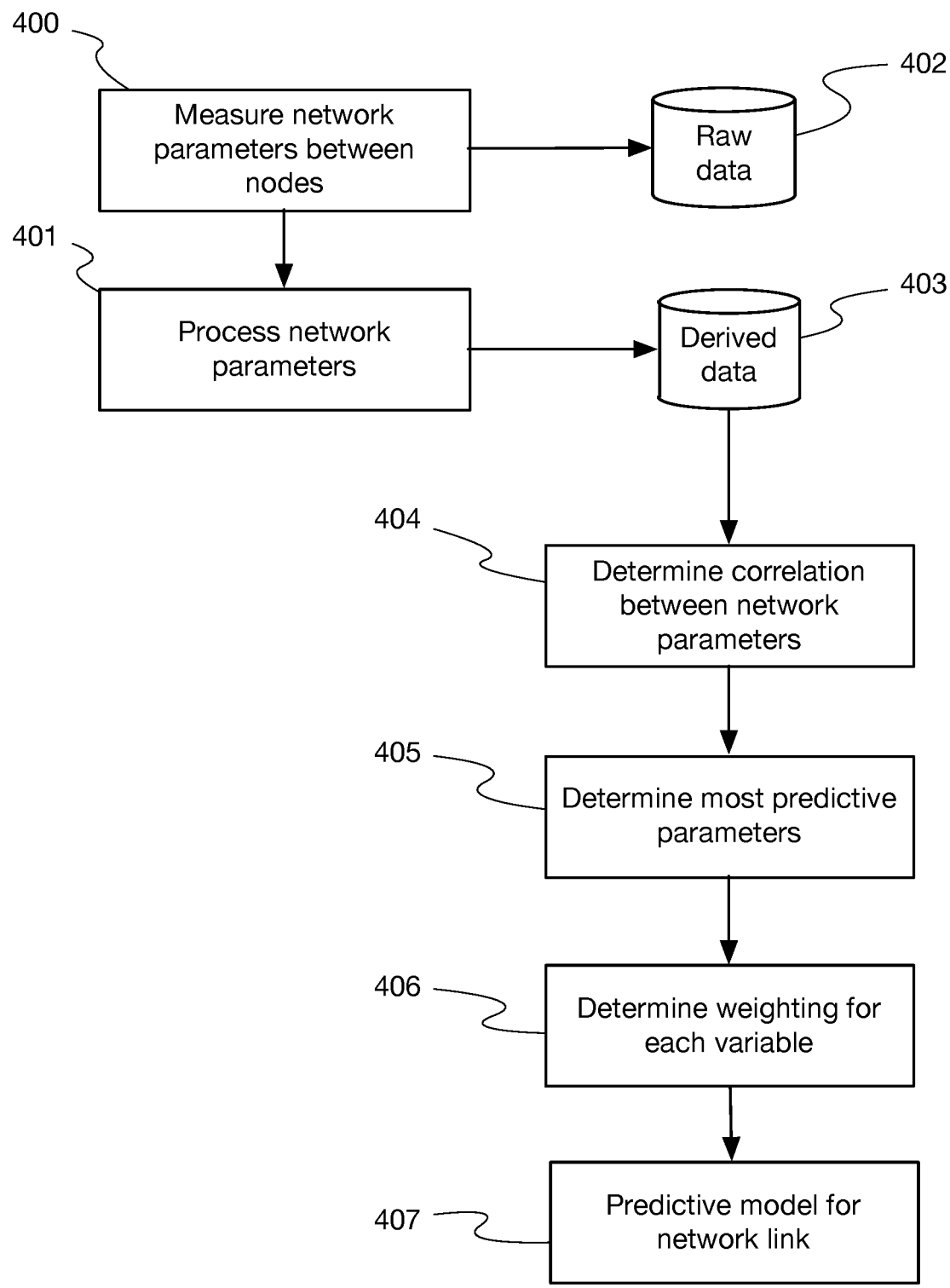
FIG. 3 depicts a process for determining network parameters for links in a network.

FIG. 3 illustrates a method of measuring and characterizing a network according to one embodiment of the invention. Step 400 illustrates a periodic process that measures network parameters between nodes in networks 200 and 210 that implement embodiments of the invention. By using collected data for each link in the network an end to end route between computing device 100 and application server 300 can be determined. Examples of network parameters include but are not limited to delay, minimum bandwidth, and monetary cost. Any number of relevant parameters may be collected. Parameters may be defined by the network node provider, user of the computing device 100, the provider of the application server 300, or any combination of these. Parameters may differ depending on the protocols use as illustrated by links 101 and 102 in FIG. 2.

Data may be collected quite frequently, such as every 5 s, and is stored in memory 402 for further processing. Data may be collected more frequently or less frequently with a corresponding increase or decrease in storage 402 requirements.

In step 401 the collected network parameter data for the network links is processed to produce derived data which is stored in memory 403. In some embodiments data for each network parameter is processed by calculating counts for "bins" that represent ranges of values in the same way that a histogram is constructed. The limits for the bins for each network parameter may be determined in a number of ways including linearly or logarithmically.

The derived data 403 is then processed to determine a predictive model 407 for the network quality of each link in the network 200 or in the network 200 and 210. In embodiments, the machine learning model 407 is determined taking into account a number of factors including determining the correlation between network parameters 404, determining which are the most predictive parameters 405, and determining a weighting for each parameter 406. Furthermore, gradient boosting and decision trees may be used in determining the predictive model 407. The predictive model 407 provides an estimate of the probability that traffic over a link will meet the desired quality parameters.

Figure 4:
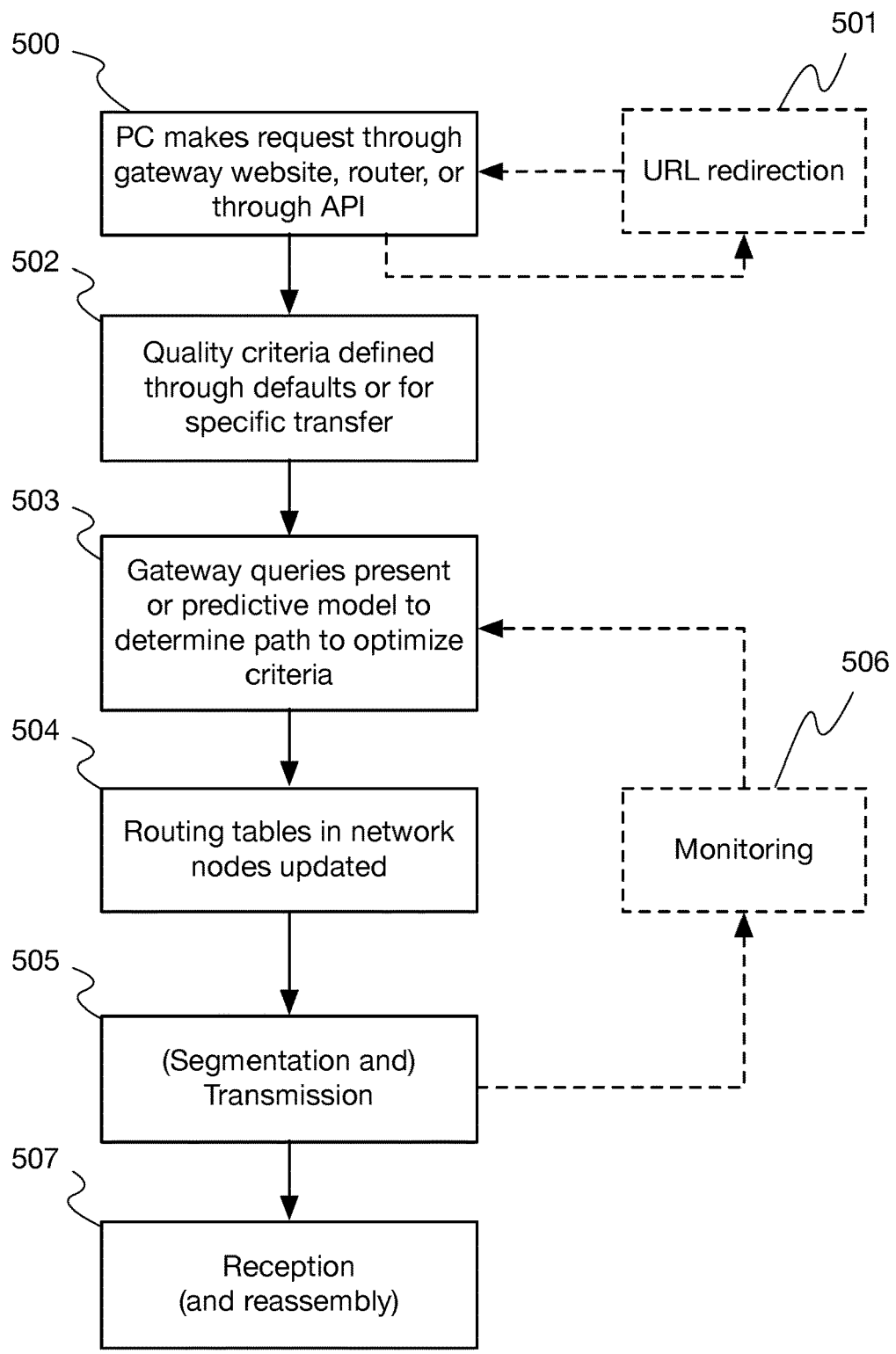
FIG. 4 depicts how a user PC interacts with embodiments of the invention.

FIG. 4 illustrates how the computing device 100 may utilize embodiments of the invention to obtain better network performance when utilizing SaaS applications or accessing data on application server 300. In step 500 a PC or computing device 100 makes a request to initiate a network connection 101 or 102. This connection may be made via a predefined URL, through software accessing an API, or through an ordinary connection to a gateway router 201. In some cases, the gateway will respond with an HTTP 302 status code to initiate a URL redirection command 501 to the gateway 201. In many cases, embodiments of the invention will be transparent to the computing device 100 and application server 300, with traffic routed or redirected through servers in the network 200 that incorporate embodiments of the invention.

As shown in step 502, for each connection, a set of network parameters will be used to define a "quality" level". This set of parameters will be used to optimize the connection in order to meet the desired quality level. The quality level, together with some or all of the parameters associated with it may be set in a variety of ways including through APIs, through a custom URL, or as additional data attached to a connection request. A default quality level may also be defined for connection requests that do not specify their own.

As discussed with respect to FIG. 3, servers will periodically measure the defined parameters over the network links of network 200 and a predictive model will be produced to estimate the likely quality level of each link. In step 503, the gateway server 201 will determine the possible end-to-end paths between itself and the closest servers 204 214 to the applications server 300. The predictive models for the links to be traversed by these possible paths will be evaluated to select a path with a high probability of achieving the quality level specific for the connection.

In step 504 the routing tables of the servers along the selected path are updated to configure the routing of the connection. Once the routing tables are updates, the initiating computing device 100 is notified and may continue to transmit. In 505 packets are transmitted along the selected path to be received at the destination 507. The first hop in the path, from the computing device 100 to the first server 201 will use networking protocols as selected by the computing device 100 in order for embodiments to be transparent from the point of view of the computing device 100. For similar reasons, the last hop from server 204 to application server 300 will use network protocols as selected by the application server 300 in order for embodiments to be transparent from the point of view of the supplication server 300. Optionally, packets may also be segmented in step 505 and then reassembled in step 507. Packets may also be encapsulated in step 505 and de-encapsulated in step 507. Alternative networking protocols may be used within the network 200 and 210 different from the protocols used by computing device 100 and application server 300. Variations in segmentation, encapsulation, and network protocols may also be included in the predictive model 407 for each link in order to determine an end-to-end path to use. In some cases, data transmission is initiated by the application server 300 with the equivalent process used as described above.

In some embodiments, in step 506 the links of the selected path will be monitored during transmission. Should the quality level become out of bounds, ether two high a quality or too low a quality, the process may recommence at step 503 to select a new path.

Figure 5:
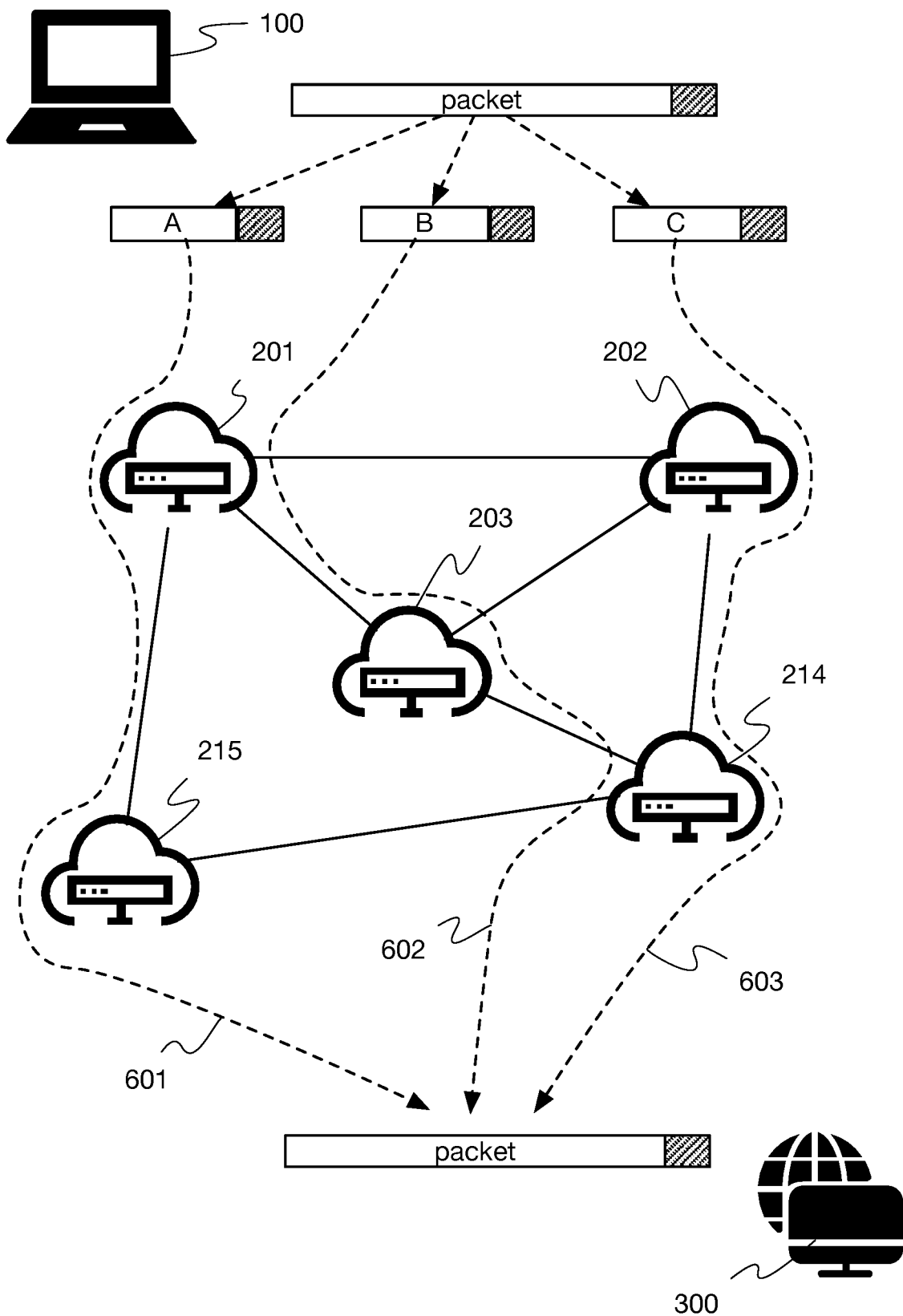
FIG. 5 depicts how a user PC interacts with embodiments of the invention that comprises segmentation and reassembly of packets.

FIG. 5 illustrated the case where packets received from computing device 100 are segmented at server 201 and reassembled before delivery to application server 300. For illustrative purposes, the packet has been segmented into three smaller packers, A, B, and C, which may be the same or different sizes. Each packet is routed independently over paths 601 602 603, which may coincide with each other, and is reassembled before delivery to application server 300. In this way, the segmentation and reassembly of the packet is transparent to the computing device 100 and the application server 300.

Though some embodiments do not require additional hardware or software on the computing device 100 or application server 300, other embodiments may benefit from these additions. In some embodiments additional software may be integrated with the computing device 100 or application server 300 to allow either of them to transmit to their closest server using multiple paths. Similarly, the server nodes in networks 200 and 210 may be configured to use multiple paths between any two servers. The multiple paths may use the same physical network, for example using multiple slots of a multiplexed network. The multiple paths may also use different networks such as a combination of a wired and wireless network or two different wireless networks.

Through the use of embodiments of the invention it is possible for network providers to commit to level of service agreements as defined by agreed upon quality levels.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

What is claimed is:

1. A method for configuring a selected data path between a source and a destination in a communications network comprising a plurality of nodes and links between pairs of said nodes, the selected data path comprising selected nodes of said plurality of nodes and selected links between pairs of said selected nodes, the method comprising:

for each link, continuously maintaining a predictive link performance model for predicting a network quality of the link, including:
  for each link, repeatedly measuring a plurality of link parameters of the link generating link parameter data;
  for each link, repeatedly processing said link parameter data of the link to generate derived link parameter data and storing said derived link parameter data in a memory;
  for each link, repeatedly determining a correlation between the link parameters of the link with use of the derived link parameter data of the link;
  for each link, repeatedly determining which of the link parameters of the link are the most predictive link parameters of the link with use of the derived link parameter data of the link; and
  for each link, repeatedly determining a weighting for each link parameter of the link with use of the derived link parameter data of the link;

receiving, by a gateway server, a network request from the source, the network request including multiple network parameters defining a requested quality level for the selected path;

selecting the selected nodes and the selected links from the plurality of nodes and plurality of links utilizing the predictive link performance model for each of said selected links and values of said multiple network parameters to determine which of the plurality of links satisfy the requested quality level; and configuring said the selected nodes between said source and said destination such that data packets sent by said source follow the selected path to said destination.

2. The method of claim 1 wherein the predictive link performance models for each of said links are determined using a machine learning algorithm.

3. The method of claim 2 wherein the machine learning algorithm utilizes a weighted combination of the plurality of measured link parameter data.

4. The method of claim 3 where a higher weighting is given to a more predictive link parameter of the plurality of measured link parameters.

5. The method of claim 1 wherein the requested quality level is defined through an API accessed by a computer program executed on the source.

6. The method of claim 1 further comprising monitoring the link quality levels of the plurality of selected links and the path quality level during data transmissions between the source and the destination.

7. The method of claim 1 wherein data received from the source is encapsulated by a gateway server and de-encapsulated by an application server.

8. A system for routing data between a source and a destination over a selected data path in a communications network comprising a plurality of nodes and links between pairs of said nodes, the selected data path comprising selected nodes of said plurality of nodes and selected links between pairs of said selected nodes, the system comprising:

a plurality of servers, a gateway server and an application server, coupled together through the communications network;

said gateway server configured for:
for each link, continuously maintaining a predictive link performance model for predicting a network quality of the link, including:
for each link, repeatedly measuring a plurality of link parameters of the link generating link parameter data;
for each link, repeatedly processing said link parameter data of the link to generate derived link parameter data and storing said derived link parameter data in a memory;
for each link, repeatedly determining a correlation between the link parameters of the link with use of the derived link parameter data of the link;
for each link, repeatedly determining which of the link parameters of the link are the most predictive link parameters of the link with use of the derived link parameter data of the link; and
for each link, repeatedly determining a weighting for each link parameter of the link with use of the derived link parameter data of the link;
receiving, a network request from the source, the network request including multiple network parameters defining a requested quality level for the selected path;
selecting the selected nodes and the selected links from said plurality of nodes and plurality of links utilizing the predictive link performance model and values of said multiple network parameters to determine which of the plurality of links satisfy the requested quality level; and
configuring the selected nodes between said source and said destination such that data packets sent by said source follow the selected path to said destination.

9. The system of claim 8 wherein the predictive link performance models for each of said links are determined using a machine learning algorithm.

10. The system of claim 9 wherein the machine learning algorithm utilizes a weighted combination of the plurality of measured link parameter data.

11. The system of claim 10 where a higher weighting is given to a more predictive link parameter of the plurality of measured link parameters.

12. The system of claim 8 wherein said derived link parameter data is processed by calculating one count for one of a plurality of bins.

13. The system of claim 8 wherein the requested quality level is defined through an API accessed by a computer program executed on the source.

14. The system of claim 8 wherein data received from the source is encapsulated by a gateway server and de-encapsulated by an application server.

* * * * *